United States Patent
Merrick

(10) Patent No.: US 9,278,434 B2
(45) Date of Patent: Mar. 8, 2016

(54) SOCKET FASTENER REMOVAL TOOL

(71) Applicant: ToolTech, LLC, Phoenix, AZ (US)

(72) Inventor: Jake Merrick, Hinton, OK (US)

(73) Assignee: ToolTech, LLC, Phoenix, AZ (US)

( * ) Notice: Subject to any disclaimer, the term of this patent is extended or adjusted under 35 U.S.C. 154(b) by 425 days.

(21) Appl. No.: 13/767,771

(22) Filed: Feb. 14, 2013

(65) Prior Publication Data

US 2014/0224085 A1     Aug. 14, 2014

(51) Int. Cl.
| | |
|---|---|
| *B25B 23/08* | (2006.01) |
| *B25B 23/10* | (2006.01) |
| *B25B 13/44* | (2006.01) |
| *B25B 13/54* | (2006.01) |
| *B23B 31/171* | (2006.01) |
| *B25B 15/00* | (2006.01) |
| *B25B 13/50* | (2006.01) |
| *B25B 13/46* | (2006.01) |

(52) U.S. Cl.
CPC .............. *B25B 13/44* (2013.01); *B23B 31/1612* (2013.01); *B25B 13/54* (2013.01); *B25B 15/008* (2013.01); *B25B 13/462* (2013.01); *B25B 13/5083* (2013.01)

(58) Field of Classification Search
CPC  B23B 31/16; B23B 31/1612; B23B 31/1615; B23B 31/16154; B25B 15/008; B25B 13/44; B25B 13/5083; B25B 13/54
USPC ....................... 81/446, 448, 177.85, 442, 443
See application file for complete search history.

(56) References Cited

U.S. PATENT DOCUMENTS

| | | | | | |
|---|---|---|---|---|---|
| 1,294,171 | A |   | 2/1919 | Rockwell | |
| 1,366,647 | A | * | 1/1921 | Gooding | ........................ 81/446 |
| 1,887,009 | A | * | 11/1932 | Buttress | ........................ 81/446 |
| 2,573,327 | A | * | 10/1951 | Gossard | ........................ 81/446 |
| 4,084,454 | A |   | 4/1978 | Day | |
| 4,335,632 | A | * | 6/1982 | Irwin et al. | ...................... 81/446 |
| 4,535,658 | A | * | 8/1985 | Molinari | .................... 81/177.85 |

(Continued)

FOREIGN PATENT DOCUMENTS

| | | |
|---|---|---|
| JP | 2008036727 A | 2/2008 |
| JP | 2009297806 A | 12/2009 |
| KR | 1020120056219 A | 6/2012 |

OTHER PUBLICATIONS

International Search Report with Written Opinion as issued in related PCT Application No. PCT/US2014/016487; dated May 26, 2014; 10 pages.

(Continued)

*Primary Examiner* — Bryan R Muller
(74) *Attorney, Agent, or Firm* — Bracewell & Giuliani LLP

(57) ABSTRACT

An apparatus for removing a socket fastener is described. The apparatus includes a base, a camshaft, a sleeve and a cartridge. The base includes a base top section and a base bottom section. The camshaft includes lobes that extend from a camshaft top surface to a camshaft bottom surface. The camshaft is fixedly coupled to the base. The cartridge includes a cartridge top surface, a cartridge lip and a plurality of jaws. Each jaw includes a jaw counterclockwise outer cam surface, a jaw counterclockwise inner cam surface, a jaw clockwise outer cam surface, and a jaw clockwise inner cam surface. The cartridge is fixedly coupled to the sleeve and the cartridge interfaces with the camshaft. Additionally, the jaw inner cam surface interfaces with the camshaft cam profiles. The jaws rotate and engage the socket fastener.

22 Claims, 6 Drawing Sheets

(56) References Cited

U.S. PATENT DOCUMENTS

| | | | | |
|---|---|---|---|---|
| 4,583,430 | A | * | 4/1986 | Farley ............... 81/177.85 |
| 4,862,773 | A | | 9/1989 | Batten |
| 5,690,006 | A | | 11/1997 | Pulliam |
| 6,675,679 | B2 | * | 1/2004 | Dugan ................ 81/446 |
| 6,874,393 | B2 | * | 4/2005 | Kile ................... 81/446 |
| 7,004,017 | B1 | * | 2/2006 | McMahon ............. 73/85 |
| D655,586 | S | | 3/2012 | Robledo |
| 8,955,414 | B2 | * | 2/2015 | Merrick ................ 81/52 |
| 8,997,608 | B2 | * | 4/2015 | Merrick ............... 81/53.2 |
| 2005/0175431 | A1 | | 8/2005 | Schultz |
| 2009/0151515 | A1 | | 6/2009 | Veltri |
| 2014/0224075 | A1 | * | 8/2014 | Merrick ................ 81/52 |
| 2014/0224084 | A1 | * | 8/2014 | Merrick ............... 81/443 |

OTHER PUBLICATIONS

Alibaba.com, "Plastic Grip Hex Driver D1H-015~D1H-08 KTC," Accessed on Jan. 2, 2013. http://www.alibaba.com/product-tp/112624688/PLASTIC_GRIP_HEX_DRIVER_D1H_015.html.

Wikipedia.com, "Hex Key," Accessed Jan. 2, 2013. http://en.wikipedia.org/wiki/Hex_key.

Mundy, Steve. Harko's Workshop, Sep. 3, 2011. https://sites.google.com/site/harkosworkshop/technical-posts/bihexsocketsvsinglehexsockets.

Alibaba.com, "Allen Head Power Bit," Accessed on Jan. 2, 2013. http://www.alibaba.com/product-free/106464900/ALLEN_HEAD_POWER_BIT.html.

HarborFreight.com, "8 Piece 1/2" Drive Metric Impact Hex Driver Set," Accessed on Jan. 2, 2013. http://www.harborfreight.com/8-piece-12-drive-metric-impact-hex-driver-set-67895.html.

TriStarIndia.com, "Tristar Socket Sets & Accessories," Accessed on Jan. 2, 2013. http://www.tristarindia.com/socset.htm.

Oswald, Jay Joseph. "Modeling of Canted Coil Springs and Knitted Spring Tubes as High Temperature Seal Preload Devices," Case Western Reserve University, May 2005.

ToolPlanet.com, "1/4" Drive TORX Plus Bit Sockets—T8," Accessed on Jan. 2, 2013. http://www.toolplanet.com/product/SK-42938-TORX-Plus-Bit-Sockets-T8/Allen-Wrench-Torx-Set.

Grainger.com, "Westward Impact Hex Driver, 1/2 Dr, 112 In, 2 In L," Accessed on Jan. 2, 2013. http://www.grainger.com/Grainger/WESTWARD-Impact-Hex-Driver-4LZE3.

SnapOnIndustrialBrands.com, "Williams 1/2" Drive One Piece Impact Hex Bit Drivers, MM 6," Accessed Jan. 2, 2013. http://www.snaponindustrialbrands.com/Prod-21-1-3610-189/Williams_12_Drive_One_Pieceinnpact_Hex_Bit_Drivers_MM_6.htm.

* cited by examiner

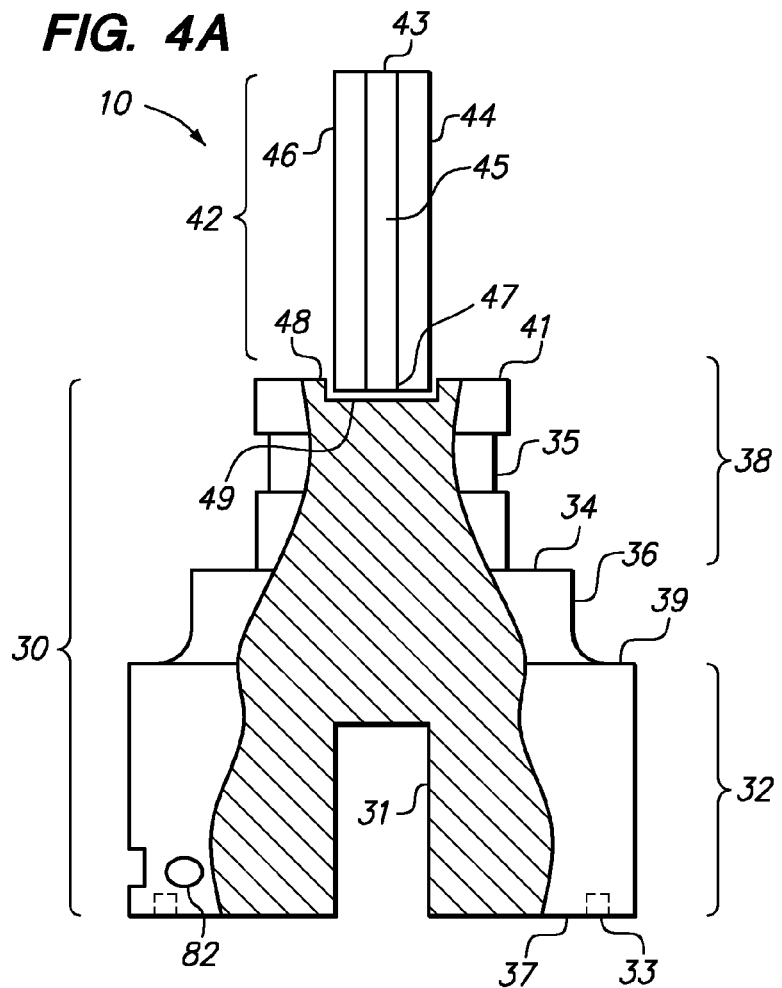
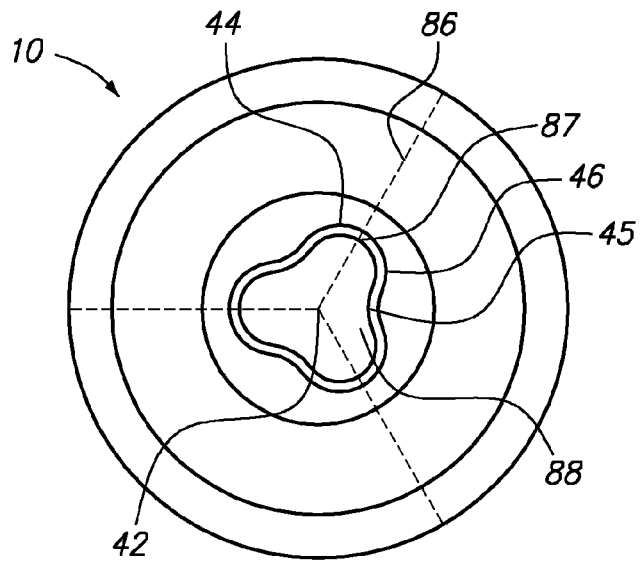

SOCKET FASTENER REMOVAL TOOL

CROSS-REFERENCE

The present patent application is related to application Ser. No. 13/767,727, now U.S. Pat. No. 8,955,414 entitled NUT REMOVAL TOOL and filed on Feb. 14, 2013; and application STUD REMOVAL TOOL having application Ser. No. 13/767,704, now U.S. Pat. No. 8,997,608 and filed on Feb. 14, 2013; and copending application FLIP SOCKET NUT REMOVAL TOOL having application Ser. No. 13/767,746 and filed on Feb. 14, 2013; and copending application DUTCHMAN FASTENER REMOVAL TOOL having application Ser. No. 13/767,758 and filed on Feb. 14, 2013.

FIELD

The invention is related to a fastener removal tool. More particularly, this invention relates to a tool for the removal of a socket fastener with a camshaft and cartridge.

BACKGROUND

A hex socket fastener is a type of fastener with a threaded cylindrical barrel that mates with a complementary thread in a fixture. The threads of a hex socket bolt may mate with the internal threads of a complementary nut to hold a stack of parts together. Likewise, a hex socket head cap screw has a threaded cylindrical barrel that mates with the complementary threads in a fixture. The bolt and nut, or the screw and fixture, are kept together by a combination of thread friction and compression of the parts.

Hex socket screws and bolts are commonly known as ALLEN® screws and bolts, wherein ALLEN® is a U.S. trademark registered by Apex Brands, Inc., a Delaware corporation. Hex socket screws are threaded on one side of a cylindrical screw for threading onto a complementary thread in a fixture or a nut. The opposite end of the screw is the head which has a smooth or knurled exterior surface and a hexagonal socket. Similarly, hex socket bolts have a cylindrical body with one end having threading for mating with a complementary nut, and the other end having a hexagonal socket. Hex socket screws and bolts are used when hexagonal or square screws or bolts will not fit; however, the interior corners or surfaces of the socket are vulnerable to being rounded off.

Hex socket screws and bolts are traditionally removed using hand wrenches, commonly known as ALLEN® wrenches, by applying force to one or more internal side faces or corners of the socket to cause it's rotation. However, where the internal side faces or corners of the socket have been stripped or damaged, or where the fastener has been corroded, it is very difficult and time consuming to remove such screws and bolts.

A further complication of screw and bolt removal using manual tools is that where the screw or bolt is very large, such as those used in oil production, manual removal using an ALLEN® wrench of such damaged screws and bolts presents danger to the operator, or manual removal is impossible because of the degree of torque required for removal.

One type of device accomplishes fastener removal by sawing off the fastener, or by using a blow torch to cut the fastener out of a fixture. However, these methods of removal result in damage to the screw or bolt, or the fixture. This problem may be solved with devices which either drill into the screw, or cut into the screw, so that torque can be applied to the screw for removal. However, these devices also result in further stripping and rounding of the screw, and the process of drilling a hole and subsequent removal is time-consuming.

Devices for the removal of hex socket fasteners using an air impact tool exist; however, in one such device, a cartridge having many small parts is used to apply torque to the damaged screw or bolt. These multiple small parts of the cartridge, such as multiple helical springs, studs and screws holding gripping jaws together are prone to breakage.

A further complication is that cartridges and other parts of removal tools are held within a cylindrical housing a retaining ring or clip. The retaining ring or clip is prone to breakage, resulting in a damaged and useless tool.

Another complication of fastener removal using a hand-powered tool is side loading, or the mechanical binding of threaded surfaces against each other. When side loading occurs, heat builds up due to friction between the threaded surfaces, creating a gall which is carried through the housing, tearing out the threads, and actually impeding removal.

Yet another complication is "chattering", where the tool does not perfectly conform to the size of the fastener. When rotative force is applied using an air impact tool, the removing tool "chatters" over the damaged corners of the fastener, further stripping the fastener, or damaging the tool interface with the fastener, causing 'radii' to form on the end of the tool.

A further problem is presented with a single device for fastener removal, because the device is limited in the size of fastener which can be removed with a single tool; that is, different sized fasteners cannot be removed with the same tool because the fastener heads cannot fit within the tool.

The use of a set of tools having a multiplicity of sizes to conform to different screw head sizes could solve the problem of imperfect conformance between the removal tool and fastener size. However, regardless of the size, the result is chattering from an imperfect size conformance; thus, stripping of the fastener socket occurs.

Further, the use of a set of tools having a multiplicity of sizes to conform to socket sizes presents another complication. If there exists a multiplicity of removal tool sizes in a set, the loss of one of the tools results in a useless tool set.

While the use of an air impact tool may eliminate much of the operator danger associated with hand wrenches, the use of an air impact tool presents a further problem. That is, the air impact tool itself creates a shock upon impact with the screw. When using sockets attached to air impact tools for screw removal, this shock impact can damage both the screw and adjacent surfaces. A further complication of some devices is that ridged teeth on the gripping surface of the jaws strip the screw socket.

It would thus be desirable to have a hex socket fastener removal tool that conforms to the size and shape of a multiplicity of sockets, where the jaws of the tool comprise one piece, rather than a multiplicity of smaller pieces which can be easily lost or damaged, and where the jaws are retained within a housing through a shock-absorbing canted coil spring.

SUMMARY

An apparatus for removing a socket fastener is described. The apparatus includes a base, a camshaft, a sleeve and a cartridge. The base includes a base top section and a base bottom section. The base top section has a base top surface, a base interior sidewall and a base groove. The interior sidewall extends from the top surface to a camshaft interface. The base bottom section has an opening at a base bottom surface. The camshaft includes a camshaft top surface, a camshaft bottom surface, and a plurality of lobes that each extends from the camshaft top surface to the camshaft bottom surface. The camshaft is fixedly coupled to the base.

The sleeve includes a sleeve lip, a sleeve bottom surface and a sleeve interior sidewall disposed between the sleeve lip and the sleeve bottom surface. The sleeve interior sidewall includes a sleeve groove. The cartridge includes a cartridge top surface, a cartridge lip and a plurality of jaws. Each jaw includes a jaw centerline, a jaw counterclockwise outer cam surface and a jaw counterclockwise inner cam surface on one side of the jaw centerline, and a jaw clockwise outer cam surface and a jaw clockwise inner cam surface on the opposite side of the jaw centerline. The cartridge configured to be fixedly coupled to the sleeve.

The cartridge interfaces with the camshaft. Additionally, the jaw inner cam surface interfaces with at least one camshaft cam profile. The jaws rotate and engage the socket fastener.

In the illustrative embodiment, each lobe is substantially semi-circular and occupies a 120° arc. Additionally, by way of example and not of limitation, an elastic component is configured to join the plurality of jaws and the sleeve.

In operation, the jaw counterclockwise inner cam surface is configured to engage with a camshaft convex counterclockwise cam when a counterclockwise force is applied to the camshaft. Additionally, the jaw clockwise inner cam surface is configured to engage with a camshaft convex clockwise cam when a clockwise force is applied to the camshaft. The base bottom section interfaces with an impact rotary tool that can oscillate between applying a counterclockwise force and a clockwise force. Additionally, the base further comprises a slot configured to receive a pin that is inserted within the slot when the camshaft is configured to interface with the impact rotary tool.

In the illustrative embodiment, a combined cartridge is presented that includes the cartridge being fixedly coupled to the sleeve. Additionally, the illustrative embodiment includes a canted coil spring that is received by the sleeve groove and the base groove. The canted coil spring enables the combined cartridge to interface with the camshaft. The canted coil spring operates within a constant deflection range when an axial load is applied. Furthermore, a plurality of different sized combined cartridges may be used, in which each combined cartridge is sized for a particular socket fastener.

BRIEF DESCRIPTION OF THE DRAWINGS

FIG. 4A shows a partial cross-sectional view of the camshaft disposed within the camshaft base of the hex socket fastener removal tool, without the cartridge or canted coil spring.

FIG. 4B shows a top view of the camshaft disposed within the camshaft base of the hex socket fastener removal tool, without the cartridge or canted coil spring.

DESCRIPTION

Figure 1A:
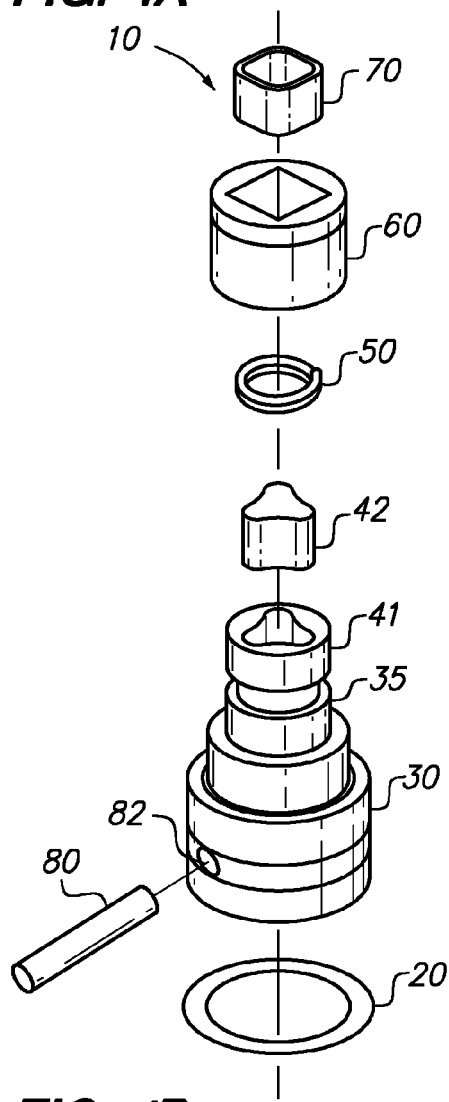
FIG. 1A shows an exploded isometric view of the illustrative hex socket fastener removal tool.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus and systems described herein may vary as to configuration and as to details. Additionally, the methods may vary as to details, order of the actions or other variations without departing from the illustrative method disclosed herein.

It is to be understood that the detailed description of illustrative embodiments provided for illustrative purposes. The scope of the claims is not limited to these specific embodiments or examples. Various structural limitations, elements, details, and uses can differ from those just described, or be expanded on or implemented using technologies not yet commercially viable, and yet still be within the inventive concepts of the present disclosure. The scope of the invention is determined by the following claims and their legal equivalents.

The apparatus described herein is generally applied to a socket fastener. Generally, a socket fastener includes a bolt and a head, in which the head has an aperture. The aperture on the head of the socket fastener is configured to receive a key or wrench, which can be used to tighten or loosen the socket fastener. By way of example and not of limitation, the illustrative socket fastener described herein is referred to as a hex or ALLEN® socket. Note, the terms hex and ALLEN® may be used interchangeably in this description. The hex socket fastener removal tool described herein is used for the removal of a hex socket fastener such as an ALLEN® head cap screw, ALLEN® bolt or other socket fasteners from a nut or a fixture. Generally, the removal of the internal wrenching socket screw or bolt employs an impact wrench tool. Alternatively, other tools that provide needed torque may also be used.

For purposes of this patent, the terms "fastener" and "screw" will be used interchangeably. Additionally for the purposes of this patent, the terms "fastener" and "bolt" will be used interchangeably. A hex socket fastener is a cylindrical fastening device, usually of metal, having a threaded end and a head end. Hex socket fasteners are widely used for fastening machine and structural components, i.e. "machine screws". The threaded end of the cylinder mates with complementary threads within a fixture or a nut. The opposite head of the cylinder has a wider diameter than the threaded end, and has a smooth or knurled surface on the sides of the head.

The head of the hex socket fastener includes a socket or aperture most commonly in the shape of a hexagon. Another illustrative hex socket may have twelve sides, known as a double hex socket. In addition to the standard hex socket fastener, there are other shapes for hex socket fasteners. In the illustrative embodiment presented herein, a hexagonal socket fastener is used; however, it shall be appreciated by those of ordinary skill in the art that other fastener geometries may be configured to interface with the hex socket fastener removal tool described herein, such as torx socket fasteners, security head sockets, pentalobular socket fasteners, or other such socket fasteners.

In the embodiments presented herein, an illustrative canted coil spring is used to engage a cartridge and sleeve assembly with a camshaft and camshaft base that receives a counterclockwise or clockwise force. The canted coil spring is presented as an illustrative spring technology that allows the cartridge to rotate freely, while ensuring that the cartridge does not slide out of the camshaft base. Alternatively, a knitted spring tube may also be used instead of the canted coil spring. The canted coil spring and the knitted spring tube may also be referred to as a seal preload device. Other spring technologies may also be used that allow the cartridge (which engages the socket of the screw) and the camshaft (which interfaces with the cartridge) to rotate freely in either a counterclockwise or clockwise direction, while at the same time ensuring that the camshaft base and camshaft do not slide out of the sleeve and cartridge assembly.

Additionally, the illustrative embodiment presented herein includes a three-lobed cam extending from the top surface of the camshaft, as described in further detail below. The three-lobed cam is configured to interface with the sleeve and cartridge assembly, which interfaces with the socket of a hex fastener. The three-lobed cam includes three lobes and three concave cam profiles. Each lobe of the illustrative three-lobed cam occupies a 120° arc and has a lobe centerline, a counterclockwise cam outer surface and a counterclockwise cam inner surface on one side of the lobe centerline, and a clockwise cam outer surface and a clockwise cam inner surface on the opposite side of the lobe centerline.

Generally, a counterclockwise force (to loosen the fastener) is applied to the polygonal shaped orifice in the camshaft base. This counterclockwise force is transferred from the camshaft to the cartridge when the cartridge interfaces with the counterclockwise cam surfaces of the camshaft. There may be instances when fastener removal requires the application of a clockwise force (tightening the screw), and then reverting back to the counterclockwise force.

The three-lobed cam described below is provided for illustrative purposes only. Alternatively, other lobed cam assemblies may also be used such as a two-lobed cam, a four-lobed cam, five-lobed cam, etc. The number of lobes and configuration of each lobe will depend on the particular socket.

Referring to FIG. 1A there is shown an illustrative hex socket fastener tool 10. The hex socket fastener removal tool includes a "base," which will also be referred to as a camshaft base 30. The hex socket fastener removal tool also includes a camshaft 42, a canted coil spring 50 and a cartridge 70. The cartridge 70 is enclosed within a sleeve 60. The camshaft base 30 may be composed of a material having the appropriate tool steel grade or stainless steel grade. The camshaft base 30 may be manufactured by machining, utilizing a mold, or other such manufacturing techniques that are specific to tool manufacturing. The camshaft base 30 includes a bottom surface 37 (shown in FIGS. 3B and 4A) and a top surface 41. The camshaft bottom surface 37 may interface with a rotary tool such as an impact wrench.

Figure 1B:
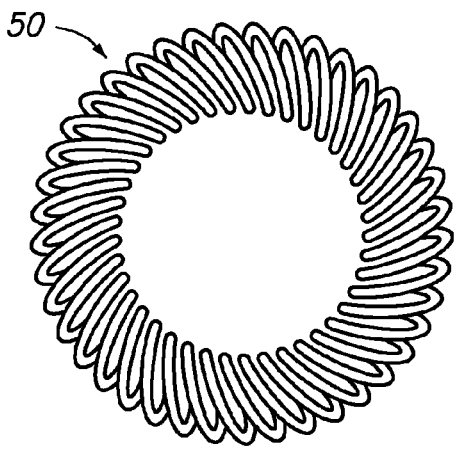
FIG. 1B shows an exploded view of a canted coil spring.

A canted coil spring 50 rests within a groove 35 between the bottom surface 37 and the top surface 41 of the camshaft base 30. FIG. 1B presents an exploded view of the canted coil spring 50. More generally, the canted coil spring 50 may be referred to as a seal preload device. For example, another illustrative seal preload device is a knitted spring tube, as shown in FIG. 2D. The canted coil spring 50 engages the sleeve 60 to the camshaft base 30, while enabling the sleeve 60 to "float" on the camshaft base 30.

As shown in FIG. 1A, the canted coil spring 50 and the base 30 are configured to be received by the sleeve 60. The base 30 and the camshaft 42 are shown in further detail in FIGS. 3A, 3B, 4A and 4B presented hereinafter. The sleeve 60 and cartridge 70 are described in further detail at FIGS. 5A, 5B 6A, and 6B hereinafter. The illustrative bottom surface 37 of the camshaft base 30 receives an illustrative O-ring 20, which is configured to interface with an illustrative impact wrench (not shown). Alternatively, the O-ring 20 may be replaced with a second canted coil spring. Further detail regarding the bottom surface 37 of the camshaft base 30 is presented in FIG. 3B, which shows a bottom view of the camshaft base bottom surface 37.

In the illustrative embodiment, the camshaft base bottom surface 37 is configured to receive an impact rotary tool. The camshaft base 30 may further include a slot 82 configured to receive a pin 80 that is inserted within the slot 82 when the camshaft base 30 is configured to interface with a rotary tool. The pin 80 holds the rotary tool in place.

More generally, the socket fastener removal tool 10 includes a fastening component with a biasing element that is configured to allow the sleeve 60 and cartridge 70 and the camshaft base 30 and camshaft 42 to rotate freely in a counterclockwise or clockwise direction, and also enable the camshaft base 30 to stay within the sleeve 60 during fastener removal and tightening operations. The illustrative fastening component with the biasing element presented herein includes seal preload device such as a canted coil spring 50.

Figure 2A:
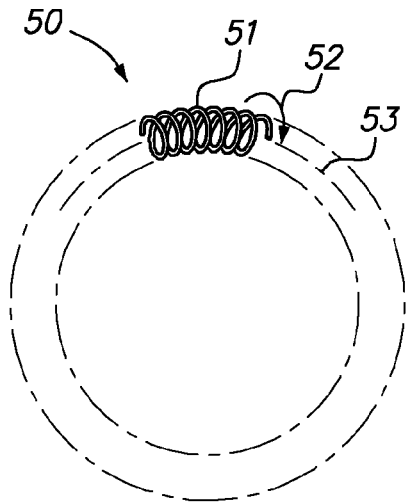
FIG. 2A shows a canted coil spring wound in a clockwise direction about the coil centerline.
Figure 2B:
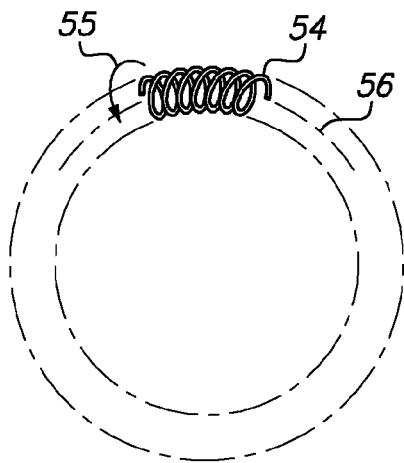
FIG. 2B shows a canted coil spring wound in a counter-clockwise direction about the coil centerline.

The illustrative embodiment may include one of two types of canted coil springs, as shown in FIGS. 2A and 2B. The first type of canted coil spring 51 presented in FIG. 2A has the coils wound in a clockwise direction about the coil centerline 53 as indicated by arrow 52. The second type of canted coil spring 54 is shown in FIG. 2B, and has the coils wound in a counterclockwise direction about the coil centerline 56 as indicated by arrow 55. The illustrative canted coil spring 50 may have the coils canted in either a clockwise or counterclockwise depending on the particular application and design constraints.

Figure 2C:
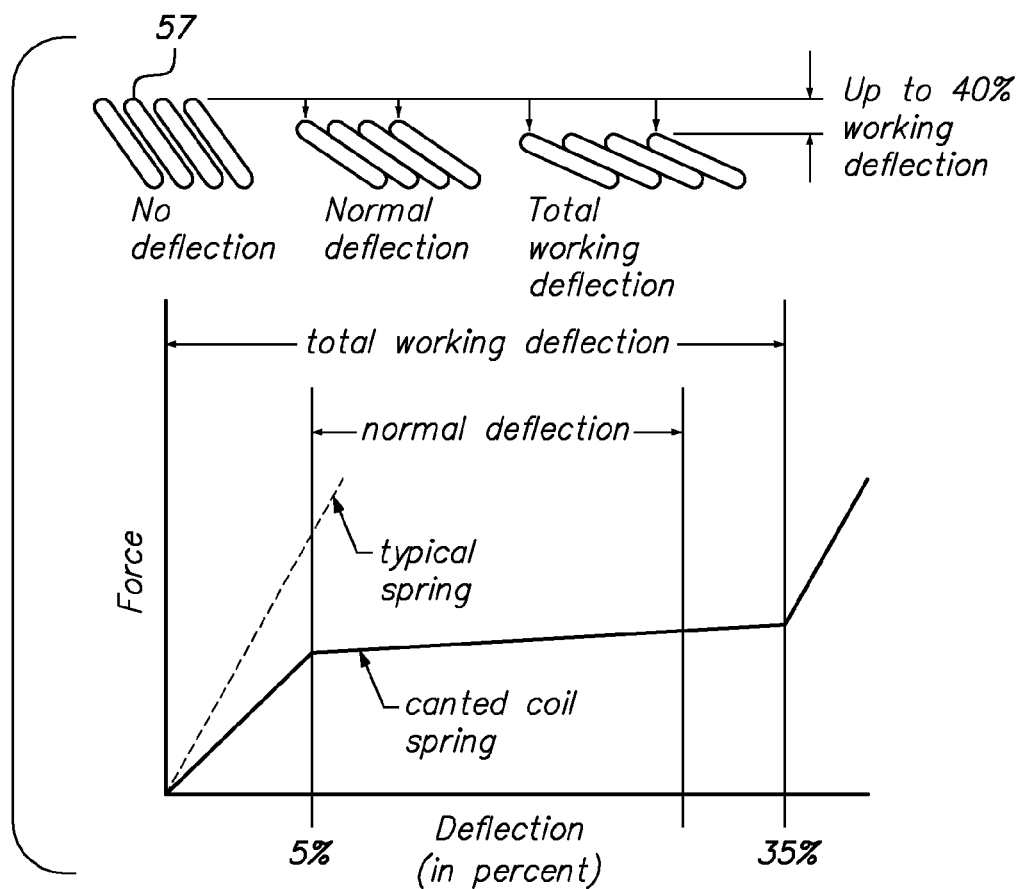
FIG. 2C shows a canted coil spring with deflection and a graph of force and deflection.
Figure 2D:
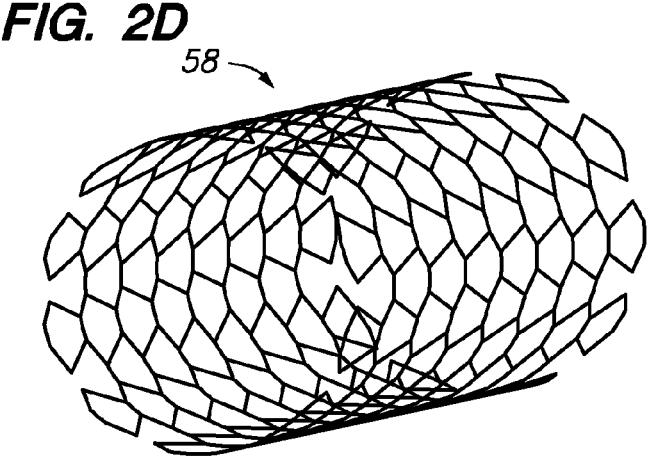
FIG. 2D shows an illustrative knitted spring tube.

Referring now to FIG. 2C, there is shown side view of a canted coil spring 50 subject to deflection from an axial load. An axial canted coil spring has its compression force 57 parallel or axial to the centerline of the arc or ring. The graph of force vs. deflection shows the canted coil spring 50 being subjected to a range of compressive (axial) forces. As more force 57 is applied to the canted coil spring 50, the angle between the coils and the vertical axis increases. In the "normal deflection" range shown in FIG. 2C, the normal deflection indicates that the force produced by a canted coil spring 50 is nearly constant over a long range of deflection, especially when compared to a typical spring. This enables the sleeve 60 to "float" on the canted coil spring 50.

As described in further detail below, the canted coil spring 50 is installed within grooves in both the camshaft base 30 and the sleeve 60. The canted coil spring design may be designed according to the following illustrative parameters, namely, the wire material, the wire diameter, the cant amplitude, the coils per inch, the size controlled by spring width, and eccentricity. The cant amplitude is the axial distance the top coil is shifted compared to a helical spring. The eccentricity is a parameter that indicates a circular cross section; as the eccentricity increases the spring becomes more elliptical. Some manufacturers use other parameters to design a canted coil spring such as the front angle and the back angle instead of coils per inch and cant amplitude.

When a canted coil spring is deformed, the top of the coils slide against the contact surface and the bottom coils rotate about their axis. For example, the bottom of the spring is constrained axially so the coefficient of friction is greater at the contact between the spring and the bottom surface than the spring and the top surface; this process enables the cage to "float" on the canted coil spring.

Another illustrative seal preload device is a knitted spring tube shown in FIG. 2D. The knitted spring tube 58 includes a series of needles interwoven about a base helix. The needle pattern is defined by the combination of a circular section and a linear section, in which both sections are piecewise continuous and smooth at their intersection. Other parameters to consider for designing canted coil springs and knitted spring tubes are provided in the thesis entitled "MODELING OF CANTED COIL SPRINGS AND KNITTED SPRING TUBES AS HIGH TEMPERATURE SEAL PRELOAD DEVICES," by Jay J. Oswald submitted in May 2005.

Figure 3A:
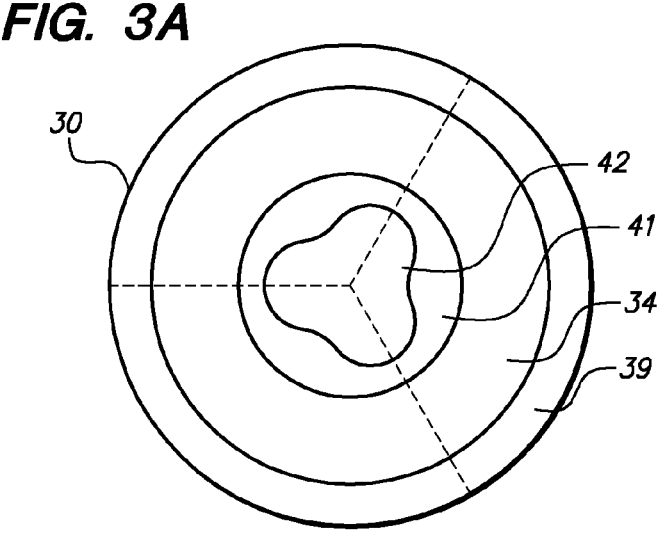
FIG. 3A shows a top view of the camshaft disposed within the camshaft base of the illustrative hex socket fastener removal tool, wherein the camshaft is not disposed within the cartridge.

Referring now to FIG. 3A and FIG. 4B, there is shown an illustrative a top view and a cross-sectional view, respectively, of the camshaft base 30 and the camshaft 42 having a three-lobed cam. The camshaft base includes a top surface 41, a top section 38, a first shoulder 34, a second shoulder 39, a bottom section 32 and a groove 35 that the canted coil spring 50 interfaces with.

Figure 3B:
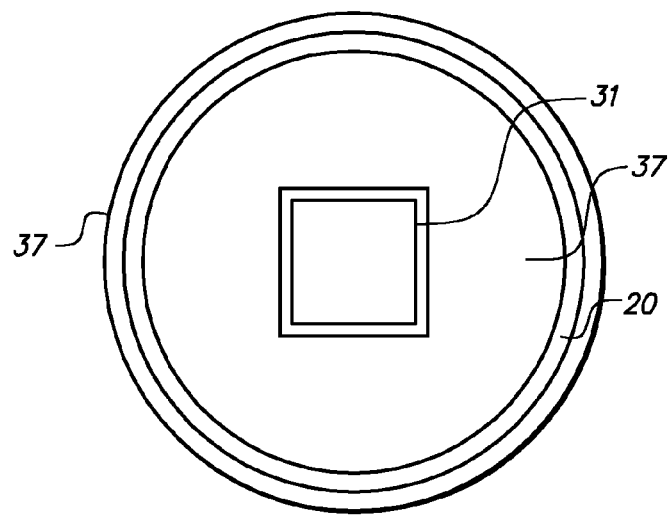
FIG. 3B shows a bottom view of the illustrative hex socket fastener removal tool.

Referring now to FIG. 3B, there is shown an illustrative bottom view of the bottom surface 37. A rotary power tool is configured to slidably couple with the polygon shaped opening 31. Alternatively, a second canted coil spring may be used instead of the O-ring 20. The second canted coil spring can also absorb additional axial loading, thus enabling the cage to effectively grip the stud with minimal interference from the compressive forces emanating from the rotary power tool.

The illustrative rotary power tool may be an impact wrench having an anvil (not shown) configured to be received by a polygon shaped opening 31 at the bottom surface 37 of the hex socket fastener removal tool 10. Although the opening is shown as being square shaped, a circular or elliptical shaped opening may also be configured to match the shape of the rotary power tool.

An impact wrench is a power tool that delivers a high torque output by storing energy in a rotating mass and then delivering the energy to the output shaft. The power source for an impact wrench is generally compressed air. When a hammer, i.e. rotating mass, is accelerated by the power source and then connected to an anvil, i.e. output shaft, this creates the high-torque impact. When the hammer spins, the hammer's momentum is used to store kinetic energy that is then delivered to the anvil in a theoretically elastic collision having a very short impact force.

With an impact wrench, the only reaction force applied to the body of the tool is the motor accelerating the hammer, and thus the operator feels very little torque, even though a very high peak torque is delivered to the anvil. The impact wrench delivers rotational forces that can be switched between counterclockwise rotation and clockwise rotation. Additionally, the impact wrenches deliver oscillating compressive forces along the axis of the anvil of the impact wrench. Thus, when removing a fastener, the anvil of the impact wrench is typically along a vertical axis and the impact wrench delivers oscillating compressive forces along the axis of the anvil, i.e. axial load, and rotational forces.

Referring now to FIG. 4A, where there is shown a cross-sectional view of the camshaft base 30 and the camshaft 42. An interior sidewall 48 extends from the camshaft base surface 47 to a camshaft interface 49. By way of example and not of limitation, the cam interior sidewall 48 includes three cam interior sidewall lobes. The cam interior sidewall lobes are equidistant from each other so that the arc occupied by each lobe is each approximately 120°. The cam interior sidewall 48 is configured to interface with the camshaft 42, which interfaces with the cartridge 70 (shown in FIGS. 1A, 5 and 6).

The camshaft base 30 includes a top section 38 between the base top surface 41 and the first shoulder 34. The top section 38 includes a first camshaft groove 35 that is configured to receive the canted coil spring 50. The first camshaft groove 35 extends around the exterior perimeter of the camshaft base 30. The camshaft base 30 also includes a middle section 36 disposed between the first shoulder 34 and a second shoulder 39.

The camshaft base 30 further includes a bottom section 32 which extends from the second shoulder 39 to the bottom surface 37. The camshaft bottom end 32 may also include a slot 82 for receiving the pin 80 (shown in FIG. 1A). The camshaft bottom section 32 further includes a polygon-shaped shaped opening 31 in the bottom surface 37 for interfacing with the impact wrench. By way of example and not of limitation, the polygon shaped opening 31 is sized proportionate to the size of the impact wrench, such as ¼", ⅜", ½", ¾", 1", 1½", 2½", ½" drive impact wrenches. Additionally, a second camshaft groove 33 receives illustrative O-ring 20 (shown in FIG. 1A).

Referring now to FIG. 4B, there is shown the camshaft 42. The camshaft 42 includes three lobes 88 that each has a lobe centerline 86. Each lobe 88 has a distal portion 87 along the lobe centerline 86 that is furthest from the center of the camshaft 42. Additionally, each lobe includes three counterclockwise convex cam interfaces 44 on one side of each lobe centerline 86, and three clockwise cam interfaces 46 on the opposite side of the lobe centerline 86. Between the lobes, there is a concave cam interface 45.

The illustrative lobe centerlines 86 are 120° apart from each other. Each counterclockwise convex cam interface 44 occupies a 30° arc. Each clockwise convex cam interface 46 occupies a 30° arc, and each concave cam interface 45 occupies a 60° arc.

In the illustrative embodiment presented in FIG. 4B, the distance between the distal portion of the lobe 87 and the center of the camshaft 42 is greater than the semi-circular radius used to form the counterclockwise convex cam interface 44 and the clockwise convex cam interface 46. In the illustrative embodiment shown in FIG. 4B, the semi-circular radius used to form the counterclockwise convex cam interfaces 44, and the clockwise convex cam interface 46 share the same center radius. Alternatively, the semi-circular radius used to form the counterclockwise cam interfaces 44, and the clockwise convex cam interfaces 46 may each have a different center radius.

Referring back to FIG. 4A, the camshaft 42 includes a top surface 43 and a bottom surface 47. As shown in FIG. 4B, the camshaft 42 further includes three counterclockwise convex cam interfaces 44, three clockwise convex cam interfaces 46, and three concave cam interfaces 45. The counterclockwise convex cam interfaces 44, clockwise convex cam interfaces 46 and concave cam interfaces 45 all extend from the camshaft top surface 43 to the camshaft bottom surface 47.

The camshaft 42 is fixedly coupled to the camshaft base interior sidewall 48 and the camshaft interface 49. By way of example and not of limitation, the camshaft 42 is constructed of heat treated S7 steel that measures 52-54 on the Rockwell C scale, as measured with a Hardness Tester, such as that described in U.S. Pat. No. 1,294,171, "HARDNESS TESTER," Hugh M. Rockwell and Stanley P. Rockwell, issued Feb. 11, 1919. S7 steel is a shock-resistant, air-hardening steel used for tools, and which is designed for high impact resistance at relatively high hardness in order to withstand chipping and breaking. In an alternative embodiment, H-13 steel is used, measuring 44-46 on the Rockwell C scale. Other alloys may also be used. Steels used are not plated or coated, other than surface treatment to produce a black oxide finish for corrosion resistance.

Generally, a counterclockwise force (to loosen the hex socket fastener) is applied to the camshaft base 30 for fastener removal. This counterclockwise force is transferred to the camshaft 42, which transfers force to the sleeve and cartridge assembly, which interfaces with the counterclockwise convex cam interface 44. There may be instances when fastener removal requires the application of a clockwise force (tightening the fastener) so the camshaft base 30 is turned in a clockwise direction and this force is then transferred to the camshaft 42, the cartridge assembly 70, and the clockwise convex cam interface 46. An illustrative impact wrench may be employed that has an operator-controlled switch that can switch the direction of the force applied to the nut removal tool from counterclockwise, to clockwise, and back to counterclockwise. By performing this operation of oscillating between the counterclockwise and clockwise directions, additional torque may be transferred to the nut to more effectively remove the nut.

The illustrative six-lobed cam 42 is symmetrical and is presented for illustrative purposes only. Alternatively, other symmetrical lobed cam assemblies may also be used such as a two-lobed cam, a four-lobed cam, five-lobed cam, etc. The number of lobes, size of lobes, and configuration of each lobe will depend on the particular application.

Additionally, each lobe may have more than just two symmetrical cam surfaces (i.e. clockwise inner cam surface and counterclockwise inner cam surface). For example, each lobe may have three, four, five or six different cam inner surfaces that can interface with different cages or cartridges.

Furthermore, asymmetrical cam inner surfaces may also be employed. Thus, the lobed cam inner surface may have additional surfaces beyond just the symmetrical three-lobed cam surface presented herein. The inner cam surface may be asymmetrical and include a plurality of surfaces that can interface with a plurality of different cartridges.

Figure 5A:
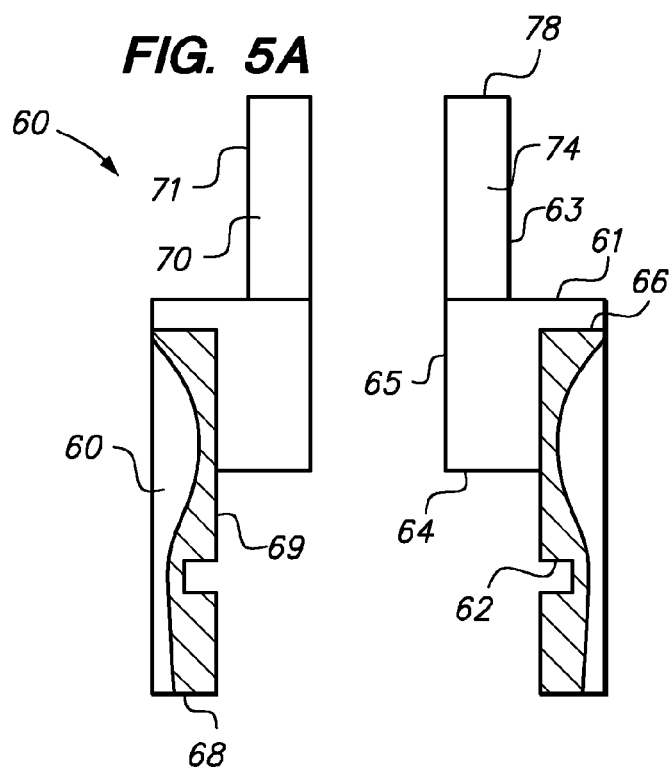
FIG. 5A shows a partial cross-sectional view of an illustrative cartridge without the canted coil spring.

Referring now to FIG. 5A there is shown a side view of the illustrative sleeve 60 and cartridge 70 assembly. The cartridge 70 is configured to interface with the camshaft 42. The sleeve 60 is configured to interface with the canted coil spring 50 and the camshaft base 30. The cartridge 70 includes a top surface 78, three jaws 71, an elastic component 74 and an elastic lip 64. The elastic component 74 includes an exterior sidewall 63 and an interior sidewall 65. The exterior sidewall 63 of the elastic component 74 extends from the top surface 78 to a cartridge shoulder 61. The interior sidewall 65 of the elastic component 74 extends from the top surface 78 to the elastic lip 64.

The sleeve 60 includes a sleeve lip 66, a sleeve interior sidewall 69 and a sleeve bottom surface 68. The sleeve lip 66 extends around the perimeter of the sleeve 60. The sleeve interior sidewall 69 defines an orifice in the sleeve 60 which extends from the sleeve lip 66 to the sleeve bottom surface 68. Additionally, the sleeve 60 has a sleeve groove 62 that is disposed between the sleeve lip 66 and the sleeve bottom surface 68. The sleeve groove 62 interfaces with the canted coil spring 50.

The cartridge shoulder 61 is fixedly coupled to the jaws 71 and to the interior sidewall 69 of the sleeve 60. By way of example and not of limitation, the elastic component 74 is bonded to the interior sidewall 69 and the jaws 71 using illustrative 30 durometer urethane rubber or other bonding material which is capable of withstanding the operating conditions of fastener removal. Additionally, the elastic component must be able to flex independent of the jaws and sleeve in a lateral direction.

Figure 5B:
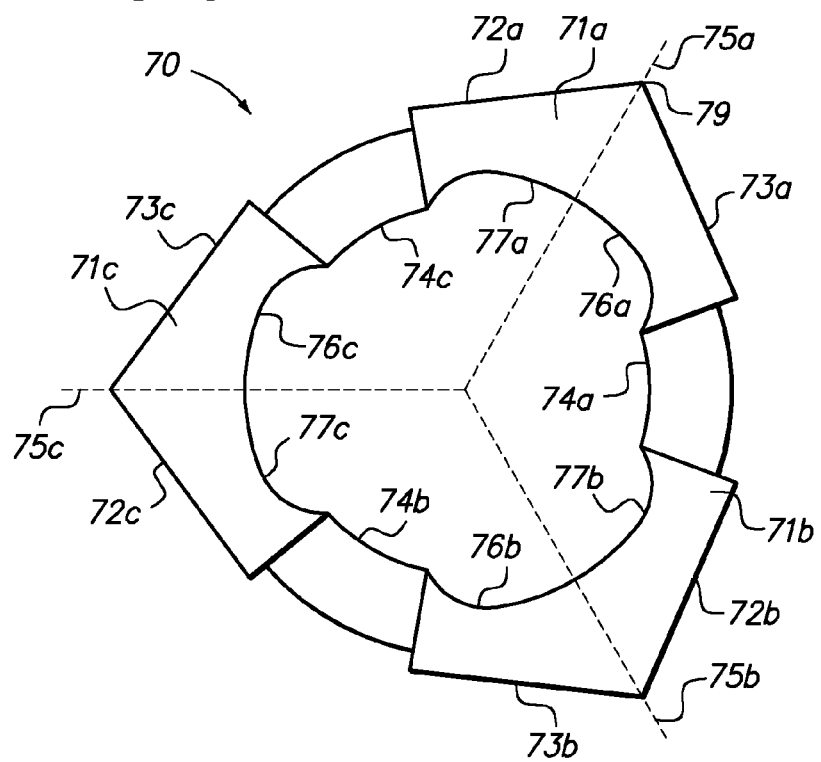
FIG. 5B shows a top view of an illustrative cartridge.

Referring now to FIG. 5B, there is shown a top view of the illustrative cartridge 70. The cartridge includes a plurality of jaws 71a, 71b, and 71c. Each of the jaws 71a, 71b and 71c, includes a jaw centerline 75a, 75b and 75c, respectively. Each jaw centerline 75 is 120° from the other jaw centerlines. Each jaw 71 has a distal portion 79 along the jaw centerline 75 that is furthest from the center of the cartridge 70.

Each of the jaws 71a, 71b and 71c includes a jaw outer counterclockwise cam surface 72a, 72b and 72c on one side of the jaw centerline 75a, 75b and 75c, respectively, and a jaw outer clockwise cam outer surface 73a, 73b and 73c on the opposite side of the jaw centerline 75a, 75b and 75c, respectively. Each jaw also includes a jaw inner counterclockwise cam surface 77 on one side of the jaw centerline 75, and a jaw inner clockwise cam surface 76 on the opposite side of the jaw centerline 75. Each jaw 71 abuts a portion of the elastic component 74, which separates the jaws and holds the jaws in place within the cartridge.

The illustrative three jaw cam outer surfaces include six different cam outer surfaces, in which three jaw cam outer surfaces are clockwise cam surfaces and three cam outer surfaces are counterclockwise cam surfaces. Likewise, the illustrative three jaw cam inner surfaces include six different cam inner surfaces, in which three jaw cam inner surfaces are clockwise cam surfaces and three cam inner surfaces are counterclockwise cam surfaces. In the illustrative embodiment, each jaw counterclockwise outer cam surface 72 and jaw clockwise outer cam surface 73 occupies a 30° arc. The jaw counterclockwise cam inner surface 77 is configured to interface with the convex counterclockwise cam interface 44 (shown in FIG. 4A). The jaw clockwise cam inner surface 76 is configured to interface with the convex clockwise cam interface 46 (shown in FIG. 4A).

For the purposes of this patent, the terms "elastic component" and "webbing" are used interchangeably. The illustrative cartridge 70 also includes the illustrative elastic component 74a that joins jaws 71a and 71b. Also, elastic component 74b joins jaws 71b and 71c. Additionally, webbing 74c joins jaws 71a and 71c. The webbing may also be embodied as an injection molded elastomeric cartridge or cage. By way of example and not of limitation, the elastomeric component configured to join the jaws has a durometer ranging from 20-40. In a narrower embodiment, the elastomeric material has a durometer of 30. By way of example and not limitation, the elastic material is a 1500 psi injection molded rubber.

Generally, the webbing material is composed of an elastic material that can withstand operating conditions for fastener removal. For example, the webbing matter may be composed of an elastic thermoplastic resin that is resistant to petroleum products. Also, other elastic or elastomeric materials such as rubber or neoprene may also be used.

The webbing 74 presses the jaws 71 firmly against the surfaces of the cam interfaces 44, 45 and 46. Further, the webbing 74 between the jaws 71 maintains symmetry between the jaws 71, and in conjunction with the sleeve 60, forms a stable cartridge assembly.

Referring now to FIG. 1A, FIG. 4A and FIG. 5A, when inserted into the sleeve 60, the camshaft base 30 slidably engages with the sleeve interior sidewall 69, and the camshaft 42 slidably engages with the cartridge jaws 71 and the interior sidewall 65 of the elastic component 74. Further, the top section 38 of the camshaft base 30 slides past the canted coil spring 50 fitted within the sleeve groove 62, and the canted coil spring 50 is received by the first camshaft groove 35. The top surface 41 of the camshaft base 30 interfaces with the elastic lip 64 of the sleeve 60. The sleeve bottom surface 68 interfaces with the first shoulder 34 of the camshaft base 30. When the canted coil spring 50 is secured within both the sleeve groove 62 and the first camshaft groove 35, the camshaft base 30 latches within the sleeve 60 with the canted coil spring 50, holding the camshaft base 30 in place within the sleeve 60.

Figure 6B:
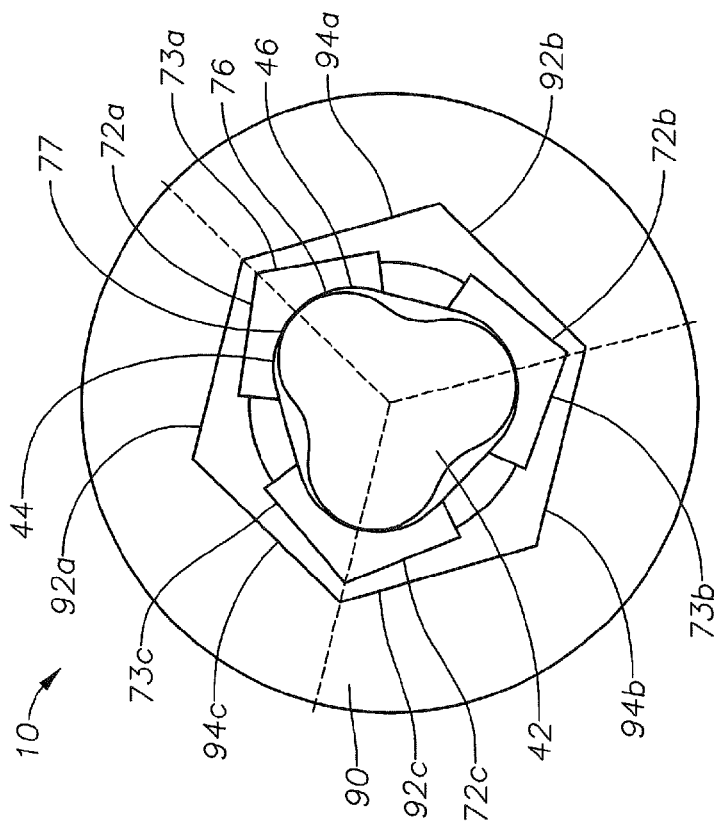
FIG. 6B shows a top view of the illustrative camshaft disposed within the cartridge, both positioned within an illustrative hex socket.
Figure 6A:
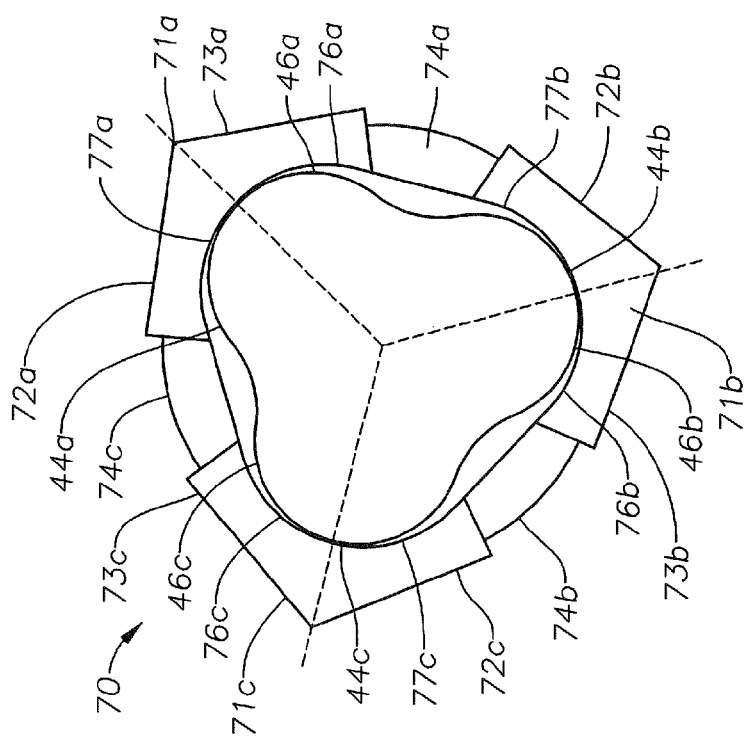
FIG. 6A shows a top view of the illustrative camshaft disposed within the cartridge.

Referring now to FIG. 6A there is shown a sectional top view of the cartridge 70 of the hexagonal socket fastener removal tool 10 with the camshaft 42 within the cartridge 70. In FIG. 6A, the jaws 71a, 71b and 71c are shown in a resting position, in which no force is applied to the camshaft 42. In this resting position, the jaws 71 are not engaging the fastener and the elastic webbing 74 used to join the jaws 71 causes the jaws 71 to remain in the resting position shown in FIG. 6A. In this resting position the hexagonal socket fastener removal tool 10 is capable of accepting the fastener 90 before a rotational force is applied to the fastener 90 (shown in FIG. 6B). The camshaft 42 includes three convex counterclockwise lobe interfaces, 44a, 44b and 44c. Additionally, the camshaft 42 includes three clockwise convex lobe interfaces 46a, 46b and 46c. Each jaw 71 has three counterclockwise jaw cam outer surfaces 72a, 72b and 72c, and three clockwise jaw outer cam surfaces, 73a, 73b and 73c. Further each jaw 71 has three counterclockwise cam inner surfaces 77a, 77b and 77c, and each jaw 71 has three clockwise cam inner surfaces 76a, 76b and 76c.

Referring now FIG. 6B, when counterclockwise force is applied to the camshaft base 30 (shown in FIG. 1A, 3A, 4A), this causes the camshaft 42 to shift approximately 30° to the left and the jaws 71 are biased radially outwards by the camshaft 42. When the camshaft 42 is rotated counterclockwise by a rotary power source, such as the air impact wrench described above, this counterclockwise force causes the convex counterclockwise lobe interface 44 to engage with the counterclockwise jaw cam inner surface 77. When the jaws are biased radially outwards by the camshaft 42, and the effective circumference of the cartridge is enlarged, this causes the elastic webbing 74 to flex. When the jaws 71 are biased radially outwards, the jaw cam outer counterclockwise surfaces 72a, 72b and 72c engage three of the counterclockwise flat surfaces of the hexagonal socket 92a, 92b and 92c, respectively. The counterclockwise force is applied in a 30° arc along the three counterclockwise hexagonal socket surfaces 92a, 92b and 92c, applying force along 90° of the hexagonal socket, rotating the fastener counterclockwise for removing the fastener.

More specifically, the hexagonal socket fastener removal tool is configured to turn in a counterclockwise manner. This rotation causes the camshaft counterclockwise convex cam surfaces, 44a, 44b and 44c to apply force to the jaw counterclockwise cam inner surfaces 77a, 77b and 77c, respectively. In operation, the deformation of the elastic component 74 upon the application of torque allows for the jaw counterclockwise cam outer surface 72a, 72b and 72c to contact the fastener socket 90 at multiple contact points. During counterclockwise rotation, each jaw counterclockwise cam outer surfaces 72a, 72b and 72c contacts 30° of each of the socket inner surface 92a, 92b and 92c respectively, of the flat counterclockwise surface of the socket fastener, allowing for 90° of contact. Thus, upon counterclockwise rotation, 25% of the surfaces of the socket of the fastener are in contact with the hex socket fastener removal tool.

There may be instances when fastener removal requires the application of a clockwise force (tightening the nut) so the camshaft base 30 is turned in a clockwise direction. When this clockwise force is applied to the camshaft base 30, this causes the camshaft to shift approximately 30° to the right and the jaws are biased radially outwards by the cam. When the camshaft 42 is rotated clockwise by a rotary power source, such as the air impact wrench described above, this clockwise force causes the convex clockwise lobe interface 46 to engage with the clockwise jaw cam inner surface 76. When the jaws 71 are biased radially outwards by the camshaft 42, and the effective circumference of the cartridge is enlarged, this causes the elastic webbing 74 to flex. When the jaws 71 are biased radially outwards, the jaw cam outer clockwise surfaces 73a, 73b and 73c engage three of the clockwise flat surfaces of the hexagonal socket 94a, 94b and 94c. The clockwise force is applied in a 30° arc along the three clockwise hexagonal socket surfaces 94a, 94b and 94c, applying force along 90° of the hexagonal socket, rotating the fastener clockwise for tightening the faster.

More specifically, when the hexagonal socket fastener removal tool is configured to turn in a clockwise manner, this rotation causes the camshaft clockwise convex cam surfaces, 46 to apply force to the jaw clockwise cam inner surfaces 76. In operation, the deformation of the elastic component 74 upon the application of torque allows for the jaw clockwise cam outer surfaces 73a, 73b and 73c, respectively, to contact the fastener socket 90 at multiple contact points. During clockwise rotation, each jaw clockwise cam outer surface 73a, 73b and 73c contacts 30° of the socket inner surface 94a, 94b and 94c, respectively, of the flat clockwise surface of the socket fastener, allowing for 90° of contact, or 25% of the surfaces of the fastener.

Additionally, during fastener removal, the operator may increase the amount torque applied to the fastener by toggling between applying a counterclockwise force and a clockwise force using the hexagonal socket removal assembly described herein.

The illustrative jaw outer cam surface 71 having three jaws is symmetrical and is presented for illustrative purposes only. Alternatively, other symmetrical jaw inner cam assemblies may also be used such as an assembly having two jaws, four jaws, five jaws, etc. The number of jaws and configuration of each jaw will depend on the particular application.

Additionally, each jaw may have more than just two symmetrical cam surfaces (i.e. clockwise outer cam surface and counterclockwise outer cam surface). For example, each jaw may have three, four, five or six different cam outer surfaces that can interface with different shaped fastener sockets.

Furthermore, asymmetrical jaw cam outer surfaces may also be employed. Thus, the jaw cam outer surface may have additional surfaces beyond just the symmetrical three jaw cam surface presented herein. The jaw outer cam surface may be asymmetrical and include a plurality of surfaces that can interface with a plurality of different fastener socket shapes.

Alternatively, the hexagonal socket fastener removal apparatus 10 described above may not require a canted coil spring 50 or other such seal preload device.

It is to be understood that the detailed description of illustrative embodiments provided for illustrative purposes. The scope of the claims is not limited to these specific embodiments or examples. Various structural limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. An apparatus for removing a fastener having a socket cavity with polygonal drive flats, the apparatus comprising:
   a base having a longitudinal axis, the base including,
      a base top section having a base top surface,
      a base bottom section having a polygon shaped opening at a base bottom surface to receive a rotary tool to rotate the base;
   a camshaft that includes a camshaft top surface and a plurality of lobes, each of which extends from the camshaft top surface to the base top surface;
   the camshaft being coupled for rotation in unison with the base;
   each of the lobes of the camshaft having a curved distal surface with a lobe centerline extending from the axis, a curved counterclockwise convex cam surface joining the distal surface on one side of the lobe centerline and a curved clockwise convex cam surface joining the distal surface on an opposite side of the lobe centerline;
   a plurality of curved concave cam surfaces, each joining the clockwise cam surface of one of the lobes with the counterclockwise cam surface of an adjacent one of the lobes;
   the distal surface of each of the lobes being farther from the axis than the counterclockwise and clockwise convex cam surfaces and the concave cam surfaces;
   a rigid sleeve mounted on the base top section so as to allow an increment of rotation of the base relative to the sleeve;
   a cartridge that includes a plurality of jaws, in which each jaw includes a jaw centerline, a flat jaw counterclockwise outward facing cam surface and a curved jaw counterclockwise inward facing cam surface on one side of the jaw centerline, and a flat jaw clockwise outward facing cam surface and a curved jaw clockwise inward facing cam surface on the opposite side of the jaw centerline, the outward facing cam surfaces joining each other at corner;
   the cartridge configured to be fixedly coupled to the sleeve for rotation in unison;
   the camshaft extending through the sleeve and the cartridge with one of the convex cam surfaces of each of the camshaft lobes in engagement with one of the inward facing cam surfaces of one of the jaws; and wherein
   an increment of rotation of the base and the camshaft relative to the sleeve and the cartridge causes the camshaft to move the jaws outward to and engage the drive flats of the socket cavity, and continued rotation of the base and the cartridge in unison causes rotation of the fastener.

2. The apparatus of claim 1 further comprising:
   a sleeve groove on an inner diameter portion of the sleeve;
   a base groove on an outer diameter portion of the base that aligns with the sleeve groove; and
   a spring located in the aligned sleeve and base grooves to retain the sleeve on the base, the spring allowing the increment of relative rotation between the base and the sleeve.

3. The apparatus of claim 1, further comprising an elastic component configured to join the plurality of jaws to each other, the elastic component having a portion extending into and bonded to an inner diameter portion of the sleeve.

4. The apparatus of claim 1 wherein the plurality of the lobes comprises three lobes, and the centerlines of the lobes are spaced 120 degrees apart from each other relative to the axis.

5. The apparatus of claim 1 wherein the counterclockwise inward facing cam surface of each of the jaws is configured to engage with the counterclockwise cam portion of one of the lobes when a counterclockwise force is applied to the camshaft.

6. The apparatus of claim 5 wherein the clockwise inward facing cam surface of each of the jaws is configured to engage with the clockwise cam portion of one of the lobes when a clockwise force is applied to the camshaft.

7. The apparatus of claim 1 wherein the cartridge comprises:
   an elastomeric bottom portion that fits within and is bonded to an inner diameter portion of the sleeve;
   an elastomeric top portion joining and protruding upward from the bottom portion and the sleeve; and wherein
   the jaws are metal and are mounted to the top portion.

8. The apparatus of claim 7 wherein the jaws have axial lengths less than an axial length of the cartridge.

9. An apparatus for removing a fastener having a cavity with polygonal drive flats, the apparatus comprising:
   a base having a longitudinal axis and including,
      a base top section having a base top surface;
      a base bottom section having a polygon shaped opening at a base bottom surface for receiving a drive tool to impart rotation to the base and a base groove on an outer diameter portion of the base;
   a camshaft extending upward from the base top surface and coupled for rotation in unison with the base, the camshaft including a camshaft top surface, and a plurality of lobes, each of which extends from the base top surface to the camshaft top surface;
   each of the lobes protruding outward from the longitudinal axis along a lobe centerline, each of the lobes having a curved counterclockwise cam surface extending in a counterclockwise direction from the lobe centerline, each of the lobes having a curved clockwise cam surface extending in a clockwise direction from the lobe centerline;
   the camshaft having a recess surface joining each of the counterclockwise surfaces with the clockwise surface of an adjacent one of the lobes, each recess curving inward toward and being closer to the longitudinal axis than any of the lobes;
   a rigid sleeve that includes a sleeve top surface, a sleeve bottom surface and a sleeve interior sidewall disposed between the sleeve top surface and the sleeve bottom surface, wherein the sleeve interior sidewall includes a sleeve groove;
   a cartridge that includes a cartridge top portion extending upward from the sleeve top surface and a cartridge bottom portion that extends into and is bonded to the sleeve interior sidewall for rotation with the sleeve, the top portion and the bottom portion of the cartridge being elastomeric;
   the cartridge having a plurality of metal jaws bonded into the cartridge top portion and spaced around the longitudinal axis, in which each jaw includes a jaw centerline, a jaw counterclockwise outward facing flat surface and a jaw counterclockwise inward facing curved cam surface on one side of the jaw centerline, and a jaw clockwise outward facing flat surface and a jaw clockwise inward facing curved cam surface on the opposite side of the jaw centerline, the outward facing flat surfaces of each jaw intersecting each other at a corner;
   the inward facing curved cam surfaces of each of the jaws mating with the lobes of the camshaft; and
   a spring configured to be received by the sleeve groove and the base groove to retain the sleeve on the base top section and allow limited rotation of the base and camshaft relative to the sleeve and the cartridge.

10. The apparatus of claim 9, wherein the jaws have lesser axial lengths than the cartridge.

11. The apparatus of claim 9 the top portion of the cartridge has an external flange between the top portion and the bottom portion of the cartridge that is bonded to the sleeve top surface.

12. The apparatus of claim 9 wherein the counterclockwise inward facing curved cam surface of each of the jaws is configured to engage with the counterclockwise cam surface of one of the lobes when a curved counterclockwise force is applied to the camshaft.

13. The apparatus of claim 9 wherein the clockwise inward facing curved cam surface of each of the jaws is configured to engage with the clockwise cam surface of one of the lobes when a curved clockwise force is applied to the camshaft.

14. The apparatus of claim 9 wherein the plurality of metal jaws comprises three metal jaws.

15. The apparatus of claim 9 wherein each of the jaws has two side edges, each of the side edges extending from one of the outward facing flat surfaces to one of the inward facing curved cam surfaces, the side edges of the jaws being bonded to the top portion of the cartridge.

16. An apparatus for removing a fastener having a polygon shaped cavity, the apparatus comprising:
a base having a longitudinal axis and comprising
a base top section that extends from a base top surface to a shoulder, a groove disposed between the top surface and the shoulder;
a base bottom section that extends from the shoulder to a bottom surface, the bottom section includes a polygon shaped opening in the bottom surface for receiving a tool to impart rotation to the base;
a camshaft joined to the base and extending upward from the base top section for rotation in unison, the camshaft including a camshaft top surface, a camshaft bottom and a plurality of lobes, each lobe extends from the top surface to the camshaft bottom;
each lobe including a lobe centerline, a curved counterclockwise convex cam interface on one side of the lobe centerline, a curved clockwise convex cam interface on the opposite side of the lobe centerline, and the camshaft having a curved concave cam interface between each lobe;
a rigid sleeve that includes a sleeve shoulder, a sleeve bottom surface and a sleeve interior sidewall disposed between the sleeve shoulder and the sleeve bottom surface, the sleeve interior sidewall includes a sleeve groove;
a cartridge through which the camshaft extends, the cartridge having a cartridge top portion and a cartridge bottom portion formed of an elastomeric material, the bottom portion being bonded to the interior sidewall of the sleeve above the sleeve groove;
the top portion of the cartridge having a plurality of slots extending from an outer diameter to an inner diameter of the top portion of the cartridge;
a plurality of jaws, each of the jaws having side edges bonded to the top portion of the cartridge within one of the slots, each jaw includes a jaw centerline, a jaw counterclockwise outward facing flat surface and a jaw counterclockwise inward facing cam surface on one side of the jaw centerline, and a jaw clockwise outward facing flat surface and a jaw clockwise inward facing cam surface on the opposite side of the jaw centerline, the outward facing flat surfaces of each of the jaws intersecting each other at an obtuse angle; and
a canted coil spring configured to be received by the sleeve groove and the groove of the camshaft base to retain the sleeve on the top portion of the base and allow limited rotation of the base and the camshaft relative to the sleeve and the cartridge.

17. The apparatus of claim 16 the plurality of lobes comprises three lobes with the centerlines spaced 120 degrees apart.

18. The apparatus of claim 16 wherein each of the slots has a circumferentially extending edge that is spaced axially above the sleeve shoulder.

19. The apparatus of claim 16 wherein the counterclockwise inward facing cam surface of each of the jaws is configured to engage with the counterclockwise convex cam interface of one of the lobes when a counterclockwise force is applied to the camshaft.

20. The apparatus of claim 16 wherein the clockwise inward facing cam surface of each of the jaws is configured to engage with the clockwise convex cam interface of one of the lobes when a clockwise force is applied to the camshaft.

21. The apparatus of claim 16 wherein the top portion of the cartridge has an external flange that is bonded to the sleeve shoulder.

22. The apparatus of claim 16 wherein the inward facing cam surfaces of each of the jaws are symmetrical about the centerline of the jaw.

* * * * *